(12) United States Patent
Wansbrough et al.

(10) Patent No.: US 12,074,957 B2
(45) Date of Patent: Aug. 27, 2024

(54) RESOURCE MANAGEMENT FOR RELIABILITY

(71) Applicant: MICROSOFT TECHNOLOGY LICENSING, LLC, Redmond, WA (US)

(72) Inventors: Keith Stuart Wansbrough, Falkirk (GB); Colin Tregenza Dancer, Hampshire (GB); Mark Edward Overton, Bottisham (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 34 days.

(21) Appl. No.: 17/826,077

(22) Filed: May 26, 2022

(65) Prior Publication Data
US 2023/0319162 A1    Oct. 5, 2023

(30) Foreign Application Priority Data

Mar. 30, 2022   (GB) ...................................... 2204544

(51) Int. Cl.
*H04L 67/61*    (2022.01)
*H04L 61/4511*  (2022.01)

(52) U.S. Cl.
CPC .......... *H04L 67/61* (2022.05); *H04L 61/4511* (2022.05)

(58) Field of Classification Search
CPC ............................ H04L 67/61; H04L 61/4511
See application file for complete search history.

(56) References Cited

U.S. PATENT DOCUMENTS

| | | | | |
|---|---|---|---|---|
| 6,321,263 B1* | 11/2001 | Luzzi | ................... | G06F 11/3495 709/224 |
| 8,200,842 B1* | 6/2012 | Lau | ..................... | H04L 61/4511 709/245 |
| 10,938,661 B1* | 3/2021 | Pignataro | ................ | H04L 41/12 |
| 2015/0052247 A1* | 2/2015 | Threefoot | ............... | H04L 67/10 709/225 |
| 2015/0127816 A1 | 5/2015 | Kruglick | | |

(Continued)

OTHER PUBLICATIONS

"International Search Report and Written Opinion Issued in PCT Application No. PCT/US22/054009", Mailed Date: Apr. 5, 2023, 14 Pages.

*Primary Examiner* — Andrew C Georgandellis
(74) *Attorney, Agent, or Firm* — Han Gim; Newport IP, LLC

(57) ABSTRACT

A method performed by a health service configured to update a domain name system (DNS) to enable clients, which use the DNS, to allocate service requests to a plurality of service instances which provide the service wherein each service instance comprises a microservice architecture is presented. The health service requests outcome data from at least one of the service instances, and calculates a status indicator for the service instance, wherein the status indicator is calculated based on results from internal recursive checks performed throughout the microservice architecture of the service instance and heuristic calculations performed on service request performance data. After calculating the status indicator, the health service triggers a dynamic update to the DNS according to the calculated status indicator.

20 Claims, 8 Drawing Sheets

(56) References Cited

U.S. PATENT DOCUMENTS

| | | | |
|---|---|---|---|
| 2016/0072730 A1* | 3/2016 | Jubran | H04L 47/822 |
| | | | 709/224 |
| 2019/0199611 A1* | 6/2019 | Kotadia | G06F 9/547 |
| 2020/0177641 A1* | 6/2020 | Wikoff | H04L 65/1033 |
| 2023/0059940 A1* | 2/2023 | Shankar | H04L 67/1036 |

* cited by examiner

RESOURCE MANAGEMENT FOR RELIABILITY

CROSS-REFERENCE TO RELATED APPLICATION

This non-provisional utility application claims priority from UK patent application number 2204544.7 entitled "RESOURCE MANAGEMENT FOR RELIABILITY" which was filed on Mar. 30, 2022, which is incorporated herein in its entirety by reference.

BACKGROUND

Cloud computing enables the delivery of computing services over communications networks such as the internet, intranets or other communications networks. Using cloud computing, individuals or businesses can utilize computing resources without needing to buy and maintain hardware as it is maintained by a separate service providing entity.

Microservice architectures break down software into multiple component services such that each of the component services can be altered without needing to redeploy entire applications after an update.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method performed by a health service to update a domain name system (DNS), to enable clients, which use the DNS, to allocate service requests to a plurality of service instances which provide the service. Each service instance comprises a microservice architecture. The method comprises: requesting outcome data from at least one of the service instances and calculating a status indicator for the at least one service instance, wherein a status indicator comprises information about whether the service instance is able to process the service requests; wherein a status indicator is calculated using the outcome data, wherein the outcome data is based on results from internal recursive checks performed throughout the microservice architectures of the service instance and heuristic calculations performed on service request performance data. The method also comprises triggering a dynamic update to the DNS according to the calculated status indicator.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Figure 1:
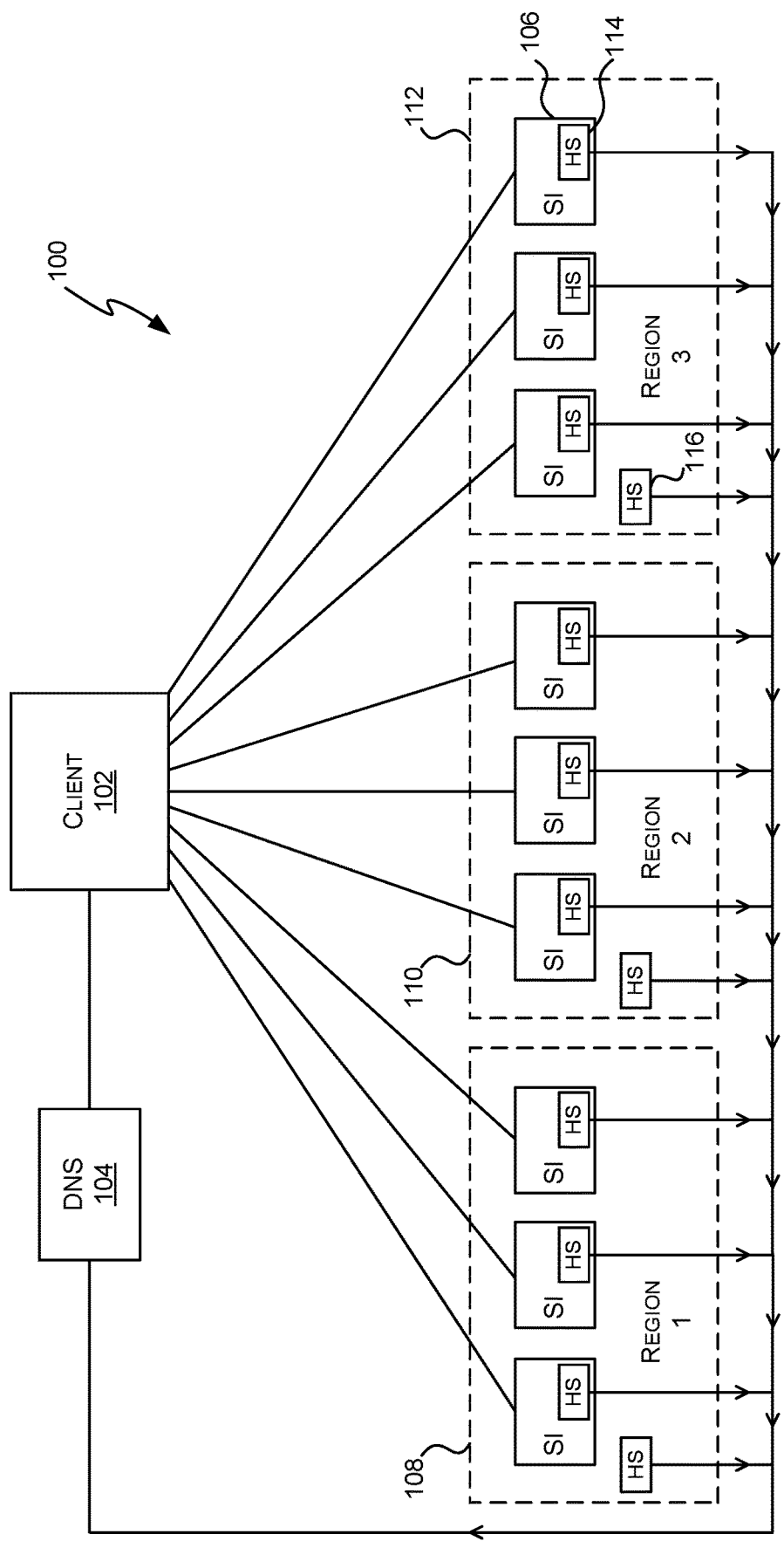
FIG. 1 is a schematic diagram of a communications network configured to facilitate the allocation of service requests.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Currently, telecommunications service providers strive for certain legal reliability standards such that when a user uses a telephone (or other device to access telecommunications services), they are provided with service. For example, a such a standard could be that the telecommunication services should only be unavailable (or 'down') for a total of 5 minutes over the course of an entire year (amounting to 99.999% availability).

Typically, service providers manage their own hardware that handles service requests (e.g., calls and access to voicemail). This hardware can be expensive as well as requiring constant maintenance to ensure the reliability requirements are met. Therefore, it is often beneficial for service providers to outsource the hardware requirements to a different provider.

Cloud technology serves as a potential solution to meet the demands of service providers seeking to outsource the management of hardware resources. However, considering the resources available through cloud services are used by multiple users, cloud technology is typically not suitable to meet the significant reliability requirements of handling telephony service requests. Therefore, there is a need for telephony services deployed using cloud technology which are able to provide the high levels of reliability required.

Examples described herein seek to address or at least ameliorate the aforementioned reliability challenges. An automated health monitoring system is described which comprises a health service receiving outcome data from one or more service instances and calculating status indicators for the service instances. The health service triggers a dynamic update to a domain name system (DNS) according to the calculated status indicators. In one example, health services are either located in each of the service instances, such that the health service receives outcome data from the service instance in which they are located (i.e., a 1:1 mapping of health services to service instances). In another example, health services are located in a region comprising a plurality of service instances, such that the health service receives outcome data from the plurality of service instances (i.e., a 1:n mapping of a health service to service instances).

The DNS comprises resource records which provide information to clients regarding the preferred/best/most suitable service instances to allocate service requests to. The term 'client' describes any network element that sends service requests to service instances. In one example, the client is a session border controller (SBC) that is a network element at a point of demarcation between different parts of a communications network, such as a firewall between an intranet of an enterprise and the public Internet, or a filtering router between regions of a communications network having different security provisions. SBCs are typically used to protect Session Initiation Protocol (SIP) based Voice over Internet Protocol (VoIP) networks. Service instances are software providing functionality to implement a service. By deploying several instances of the same service in a cloud deployment it is possible to scale up use of the service and provide service redundancy to ensure resilience. Often service instances are containerized but it is not essential to provide service instances in containerized form. In another example, the client is a user computing device which queries the DNS.

Various examples herein use SBCs and this is not intended to be limiting as any clients may be used.

The service instances are in a deployment such as a data center, cluster of web servers, or other communications network, wherein the service instances comprise microservice architectures. Microservice architectures are explained in detail with reference to FIG. 2 below. The status indicators are used to dynamically update the DNS so that when a client queries the DNS the response to the query takes into account the status indicators. The status indicators are calculated based on a combination of internal recursive checks, performed by the service instances throughout the respective microservice architectures of the service instances, and heuristic calculations performed by the service instances on service request performance data, wherein the performance data is associated with the quality of service provided following the processing of real service requests. Heuristic calculations comprise rules, criteria, thresholds or other calculations found to give useful indications of service reliability or quality. Performance data comprise measurements and empirical observations obtained automatically from network equipment.

Typically, using the example of a session border controller, a round robin or weighted random approach is used when allocating service requests to one of a plurality of service instances. In one example, the session border controller will allocate a service request to a service instance and reallocate the service request to a different service instance after determining that the initial service instance has failed to process the service request. This is inefficient and therefore the trial-and-error approach of allocating service instances is not a desirable method. A round robin approach also leads to unreliability in cases where the round robin allocation is made to a service instance which is responsive but providing less-than-excellent service. Poor service may occur after the session border controller has completed the allocation of the service request to the instance, in which case the request cannot be reallocated. For example, the service instance may accept a call from a user endpoint, such that the session border controller's job is complete, records a voicemail, but then fail to save it. The round robin approach is incapable of accounting for such an occurrence, so a different approach is required. The use of status indicators enables faster and more efficient allocation of service requests to service instances which successfully process service requests.

The inventors have found that the combination of the internal recursive checks and heuristic calculations provides particularly good reliability such as required for many telecommunication applications. The examples described herein allow for parts of the cloud network to be unreliable as the system as a whole is reliable due to the continuous and automatic health evaluation of the computing resources in the cloud network. Approaches using internal recursive checks alone are found to be inferior. This is because the internal recursive checks indicate whether a microservice is operational and can handle simple requests but do not provide a thorough indication as to whether the microservice is able to process a real service request. For example, when using internal recursive checks alone, the service request may appear to be fully operational but may still fail to process service requests. One solution is to include, in the recursive checks, tasks that resemble tasks associated with real service requests, often referred to as synthetic transactions. However, for this approach to be successful, one would need to be able to anticipate every possible problem that may occur which is not practical. Furthermore, using this approach sometimes results in service instances continuing to fail to process service requests without it being noticed. It is possible the time it takes to notice and fix the error will be too long and not meet the reliability requirements.

Approaches using heuristic calculations alone are also found to be inferior. The inventors have recognized this is because heuristic calculations are typically slower compared to internal recursive checks which presents the risk that the status indicators are not provided to the session border controller promptly enough after failure or at regular enough time intervals to be reliable. For example, when determining whether a service instance can save voicemails, an internal recursive check can explicitly look for "is the storage component working" and report a failure within seconds, whereas a heuristic calculation might take a minute or two to notice that 100% of saves in the last five minutes have failed. Heuristic calculations performed on real service request performance data are also reliant on service requests being received by the service instance. Therefore, if the service instance does not receive any service requests, it is difficult to provide the session border controller with a status indicator. The present technology overcomes this by using test service traffic to "fill in" to enable heuristic calculations when there would otherwise not be enough real service traffic to enable the heuristic calculations. Hence, using a combination of internal recursive checks and heuristic calculations means the system can benefit whilst compensating for the limitations of both approaches.

The combination of heuristic calculations and recursive checks made by the service instances of the disclosure operate in an atypical manner to enable extremely high reliability of the service provided by the service instances of the disclosure.

The combination of heuristic calculations and recursive checks improve the functioning of the underlying service instances to enable extremely reliable service to be given.

FIG. 1 shows an illustration of a communications network 100 suitable for deploying highly available telecommunications and other services in a distributed manner. The communications network 100 comprises a client 102 which is configured to query a DNS 104 to receive a DNS configuration. The client 102 is configured to allocate service requests from user endpoints to individual ones of a plurality of service instances (SI) 106 connected to the network. The client 102 queries the DNS to find which SI(s) to use and, in another example, where the DNS records support additional information, target selection information such as priority. The DNS has a dynamically updated configuration as explained below. In one example the client is a session border controller which receives service requests from a user endpoint. In the example of FIG. 1, the service instances (SI) 106 are in data centers, wherein said data centers are connected to each other forming a cloud network which is the communications network 100. In the example of FIG. 1, the service instances are grouped into regions 108, 110, 112. The regions are geographical regions assigned based on the geographical location of the service instances. For example, the service instances in region 1 108 are located within the same data center. In another example, the service instances in region 1 108 are not located within the same data center but are geographically located at a limited distance apart. It is not essential to group the service instances into data centers and regions as in FIG. 1 and the skilled person appreciates that other arrangements are possible. In the example of FIG. 1, the services instances (SI) comprise a health service (HS) 114. Additionally, or alternatively, a health service 116 is included in each region. The health service 114, 116 is configured to calculate status indicators from outcome data received from the service instance in which it is located or the plurality of service instances in its region. The health service 114, 116 is further configured to use the status indicator to trigger a dynamic update to the DNS configuration. The DNS configuration may be updated directly by the Health Service via the DNS service control plane, or written to a location and implemented via a separate convergence engine, which may also incorporate operator-configured preferences or settings. The updated DNS configuration is queried periodically by the client 102 and used to allocate future service requests.

Figure 2:
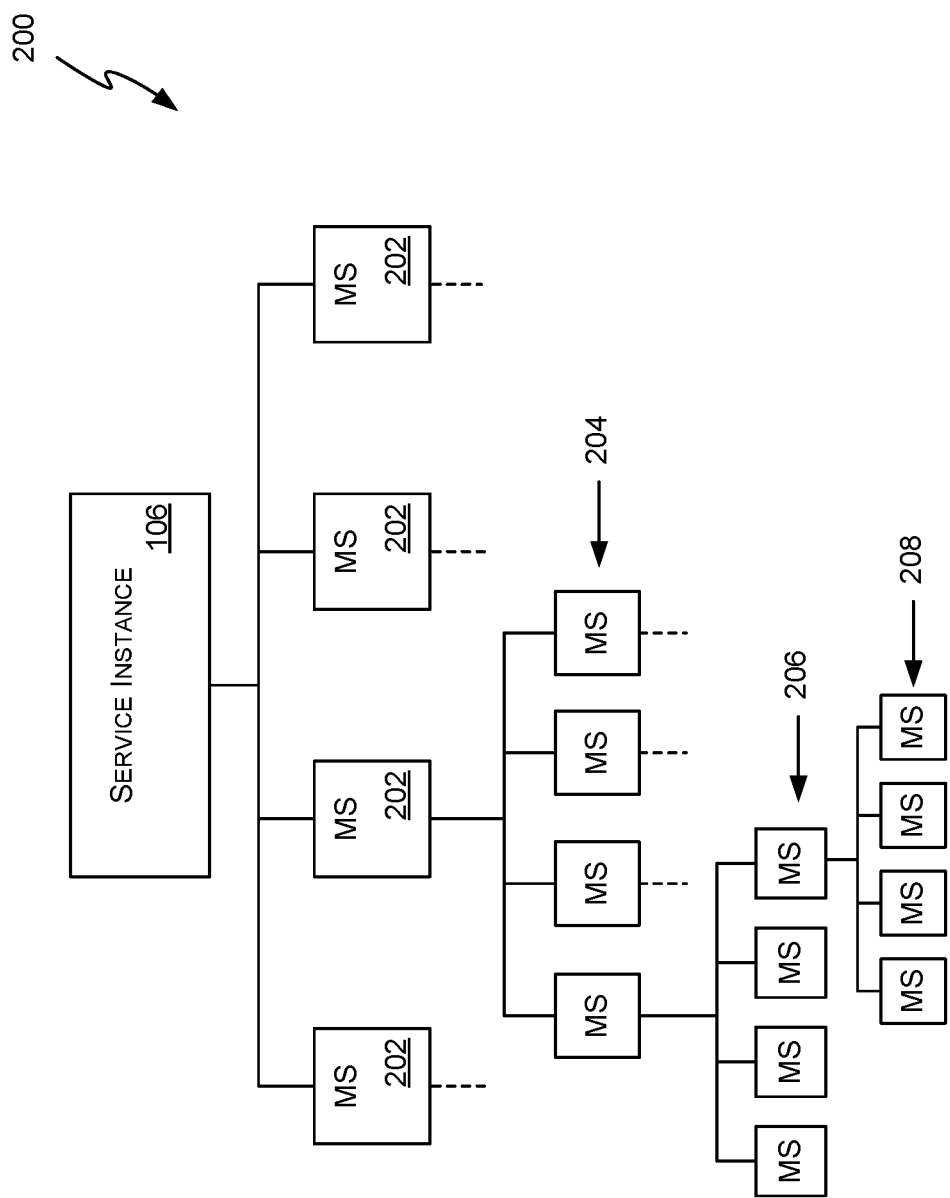
FIG. 2 shows an example of a microservice architecture.

FIG. 2 is a schematic diagram of a microservice architecture 200. A microservice architecture is formed by dividing a service into modules referred to as microservices and connecting the microservices in a particular configuration. By using microservices it is possible to reuse functionality and make distributed deployments. Each service instance 106 in the network 100 comprises a microservice architecture 200. The microservice architecture comprises a top-level service instance 106 which is connected to a first level of a plurality of individual microservices (MS) referred to herein as parent microservices 202. The parent microservices 202 in the first level are connected to a second level of individual microservices referred to herein as child microservices 204 to enable a parent microservice to communicate with a plurality of child microservices 204. A plurality of additional microservice levels 206, 208 (grandchild microservices, great grandchild microservices) are incorporated into the microservice architecture in the example of FIG. 2. Thus, the microservice architecture is a tree structure or other hierarchical structure. Different numbers of levels of the hierarchy or tree are used for different ones of the service instances 106.

In some examples, the individual microservices are configured to process individual tasks associated with an application; that is an individual microservice provides functionality for only a single task so that the individual microservice is a module and can be combined with other individual microservices in a modular manner. For example, an individual microservice is configured to receive and answer a call from a user endpoint and determine what messages to playback. In another example, an individual microservice is configured to store recordings which are played upon being requested by a customer. In another example, an individual microservice is configured to interact with a database service to store service subscriber's preferences or configurations. In another example, an individual microservice is configured to determine where to save a recorded voicemail and saving it to the determined location.

In some examples, different importance levels are assigned to the different microservices based on how vital the tasks assigned to the individual microservices are. For example, microservices configured to determine where to store voicemails and saving the voicemails are assigned a high importance level considering reliably saving and storing voicemails is a vital component of providing a reliable service. Whereas microservices configured to store service subscriber's preferences are assigned a lower importance level as, for example, the format of how messages are presented to a user (e.g. whether to play the date a voicemail was recorded alongside the message when playing a voicemail) is not considered vital to the functioning of a reliable service. The use of importance levels within the microservice architecture enables the internal recursive checks to provide more detail about the health of the service instance. For example, by only determining that one or more of the microservices of a service instance are not functioning, the status indicator calculated using the internal recursive checks allows the session border controller to completely disregard the service instance. However, by determining in the health monitoring that although the service instances may not be able to provide a full service, it can still handle the vital tasks associated with a service request. Therefore, the service instance would be considered as a fallback option if service instances providing a full service are not available instead of being disregarded.

In some examples, the service instances (or the regions of service instance) are sorted into priority tiers in the DNS records (or Smart DNS service configuration). The health services map the service instances into the priority tiers using the calculated status indicators such that service instances in the highest priority tiers provide better service than those in the lower priority tiers. For example, a service instance assessed as available and provides excellent service will be placed in a high priority tier. In some examples, the session border controller will automatically allocate service requests to service instances in the highest priority tier. The health services will also maintain a record of which tier the individual service instances is placed and dynamically update the record in response to receiving updated outcome data from the individual service instances. In some examples, if the service instances sorted into the highest priority tier are unavailable, the client will automatically allocate service requests to service instances in the priority tier below the highest priority tier. Therefore, service requests are allocated more efficiently as the client already has the information required, in the form of priority tiers, to find and automatically allocate to the next most suitable service instance when the preferred service instance is not available.

Figure 3A:
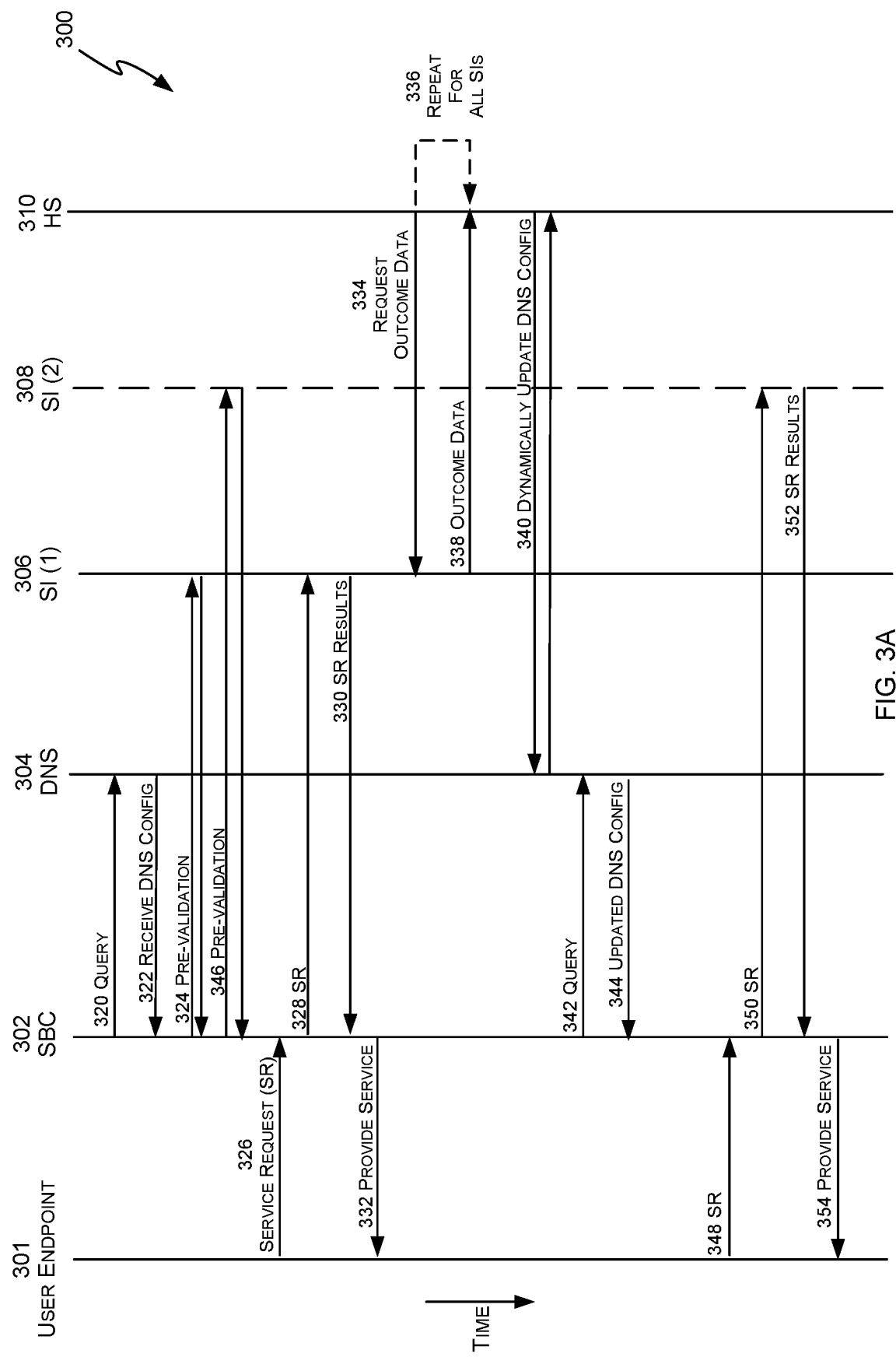
FIGS. 3A AND 3B show a time series of interactions between a session border controller, a client device and a service instance.

FIG. 3A is an example of a method performed in a communications network such as that of FIG. 1. In FIG. 3A, a user endpoint 301 is represented as a vertical line on the left hand side. The client 102 from FIG. 1 is a session border controller (SBC) 302 in FIG. 3A and is represented by a vertical line (although note the SBC can be any client). The DNS 304, a first service instance 306, a second service instance 308 and the health service 310 are also represented by vertical lines. Arrows between the vertical lines in FIG. 3 represent messages and/or processing steps. The direction of the arrows indicates the direction of message flow and the chronological order of events between a user endpoint 301, an SBC 302, a DNS 304, a first service instance (SI (1)) 306, a second service instance (SI (2)) 308 and a health service 310. The health service 310 calculates a status indicator based on received outcome data from the service instance (SI (1)) 306 and the health service 310 uses the calculated status indicator to dynamically update the DNS 304 configuration. The SBC 302 queries the DNS 304 and receives a response according to the updated DNS configuration which takes into account fresh data from the health service. The response instructs the SBC to send service requests to the second service instance 308 instead of the first service instance 306 if the calculated status indicators for the first service instance 306 indicates it is less suitable to handles service requests compared to the second service instance (SI(2)) 308. The events shown in FIG. 3A are performed automatically. In this way significant improvements in reliability of the service are obtained.

The order of the events in FIG. 3A is altered in some embodiments whilst achieving the same result. Note that FIG. 3A shows only a first service instance (SI (1)) 306 and a second service instance (SI (2)) 308 for clarity whereas in practice there are a plurality of service instances 106 as illustrated in FIG. 1.

Operation 320 shows the session border controller 302 querying the DNS 304 to determine which of the plurality of service instances is the most likely to provide a reliable service when being sent a service request. Event 322 shows the session border controller 302 receiving the response comprising an IP address of a service instance and in some examples, the session border controller 302 receives information regarding all of the possible service instances including information about the priority tiers of each of the service instances. Event 324 shows an example of where the session border controller 302 performs pre-validation of the first service instance 306 to check whether the received DNS configuration correctly maps to an accessible and responsive service instance. Pre-validation of the second service instance is also performed in some cases as illustrated at event 346.

Event 326 shows a service request being sent by a user endpoint 301 such that it is received by the session border controller 302. In one example, the service request comprises a request to establish a VoIP session by which the user will then access stored voicemail associated with their account. Examples of the uses of service requests include but are not limited to: storage of voicemails, access to voicemail services, making voice calls, making video calls, sending messages, access to subscriber's settings including greetings management, security personal identifier number (PIN) management and management of voicemail storage space.

Once the session border controller 302 receives the service request 326, it then sends 328 the service request to the first service instance 306 such that the service request 328 can be processed by the first service instance 306 to fulfill the service request 328 (such as by playing a voice mail message or carrying out another task according to the particular service). As will be described later in the timeline of FIG. 3A, the session border controller 302 will have allocated the service request 326 to the particular service instance 306 (out of a plurality of possible service instances) using a response from the DNS which is based on received status indicator generated by the plurality of service instances 106 prior to receiving the service request 326.

In some examples, where priority tiers are used, the service request is allocated to the service instance based on the priority tier in which the service instance is sorted into. For example, referring to FIG. 4, the service instance 306 in FIG. 3A could be $SI_1$ and thus sorted into the highest priority tier (tier 1). As tier 1 is the highest priority tier, service requests are automatically allocated to the service instances within tier 1. Alternatively, the service instance 306 in FIG. 3A could be $SI_3$ and thus sorted into a lower priority tier (tier 2). As tier 2 is a lower priority tier, service requests are automatically allocated to the instances in tier 2 if none of the service instances in tier 1 is available.

The service request is processed by the service instance 306. Tasks associated with the service request are assigned to different parts of the microservice architecture 200 of the service instance 306. Vital tasks may be assigned to microservices with a highest importance level whereas less vital tasks may be assigned to microservices with lower importance levels. A non-exhaustive list of examples of vital tasks is: recording, saving and retrieving voicemails or notifying subscribers of voicemails in their inbox, and a non-exhaustive list of less vital tasks is: scheduled delivery of prerecorded voicemails, sending voicemails to another subscriber, administration of subscriber settings or collection of diagnostic data.

At event 330, the service request results are sent to the session border controller 302 which then sends the service request results to the user end point 301 at event 332. Alternatively, the first service instance 306 sends the processed service request results directly to the user end point 301.

At event 334 the health service (HS) 310 requests outcome data from the first service instance 306. The health service 310 is either located in the first service instance 306 or in a region comprising a plurality of service instances. Although it is not illustrated in FIG. 3A, in one example the health service also requests outcome data from the second service instance 308 in the situation the health service 310 is in the same region as the second service instance 308. The outcome data is received by the health service 310 from the first service instance 306 at event 338. The outcome data comprises results from internal recursive checks performed by the first service instance 306 throughout the microservice architecture 200 of the first service instance 306 and the results from heuristic calculations performed by the first service instance 306 on service request performance data. If the health service 310 is connected to more than one service instance (i.e., the health service is located in a region comprising a plurality of service instances) event 336 shows the health service 310 repeating events 334 and 338 for all service instance to which it is connected. As will be described in more detail in reference to FIG. 3B, the health service 310 uses the received outcome data from the first service instance 306 to calculate a status indicator for the first service instance 306.

At event 340, the health service 310 triggers the dynamic update of the DNS 304 configuration according to the calculated status indicator. In one example, the calculated status indictor will change the DNS configuration such that the first service instance 306 is no longer recorded by the DNS as the preferred or best option for processing service requests compared to other service instance (e.g., the second service instance 308). The steps performed by the health service 310 provide ongoing automatic health monitoring of the service instance(s) to which it is connected to and provides dynamic updates to the DNS configuration such that future service requests are sent to the most suitable and reliable service instances, thus providing reliable service to user endpoints 301.

Event 342 shows the session border controller 302 querying the DNS 304, in the same manner as shown in event 320, and receiving a response that takes into account the updated version of the DNS configuration at event 344 following the update triggered by the health service 310.

Event 348 shows the user endpoint 301 sending another service request to the session border controller 302 in the same manner shown in event 326. However, in the example shown in FIG. 3A, the session border controller 302 sends the service request to the second service instance 308 in event 350 instead of sending the service request to the first service instance 306, which was done in event 328. In one example, this is as a result of the updated DNS configuration comprising information that indicates the second service instance 308 is more reliable compared to the first service instance 306 which was not the case before the update to the DNS configuration in event 340. This example shows how the system of FIG. 1 enables a service request to be processed reliably using autonomous health monitoring and dynamic updates to the DNS configuration in combination as any changes to the health or reliability of service instances is automatically detected before service requests are allocated to unreliable service instances.

At event 352, the service request results are provided to the session border controller 302 by the second service instance 308 or alternatively, directly to the user endpoint 301 in the same manner as performed in event 330 by the first service instance 306. The service request results are sent to the user endpoint in event 354.

Figure 3B:
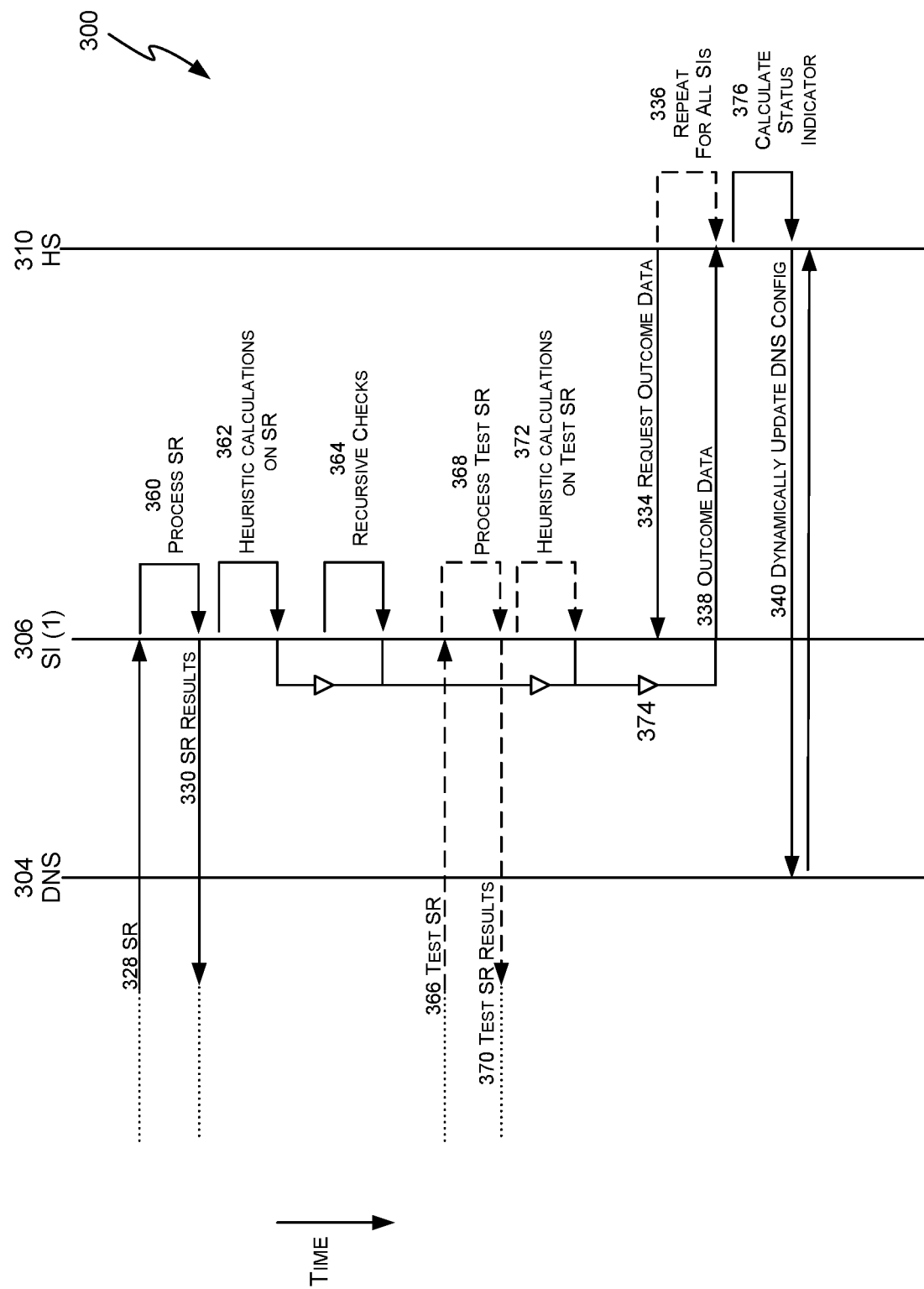

FIG. 3B is an example of a method performed in a communications network such as that of FIG. 1. Specifically, the events in FIG. 3B focus on the steps which result in a status indicator being calculated by the health service 310 for the first service instance 306. The events shown in FIG. 3B take place during the events in FIG. 3A, therefore the DNS 304, first service instance 306 and health service 310 are the same as the nodes in FIG. 3A. The order of the events in FIG. 3B is altered in some embodiments whilst achieving the same result.

Once the first service instance 306 has received the service request 328, the first service instance 306 processes the service request at event 360 before sending the processed service request results (either to the session border controller 302 or user end point 301) at event 330. The service instance then performs heuristic calculations 362 based on processing performance data associated with the degree of success of processing the service request in event 360. For example, the performance data includes the time taken to process the service request. In another example, a quality of the processed service request results is measured and included in the performance data. In another example, the heuristic calculations performed based on the service request processed in event 360 are combined with results from previous heuristic calculations. For example, a percentage of processed service request results which indicate degraded service quality is provided for the first service instance 306 (e.g., 30% of service requests processed with degraded service quality).

The first service instance 306 automatically performs internal recursive checks, at event 364. The internal recursive checks are performed repeatedly at pre-defined time intervals in some embodiments. For example, the internal recursive checks are performed every minute, every hour or every day. In another example, the internal recursive checks are performed in response to the health service 310 requesting outcome data from the first service instance 306, so that the status indicators are fresh and therefore accurate. The results of the internal recursive checks are stored locally by the service instance 306 for efficient, fast access.

The internal recursive checks 364 performed by the service instance 306 comprise probing individual microservices within the microservice architecture of the first service instance 306 to determine whether individual ones of the microservices are capable of processing service requests. Probing comprises sending a status request message to an individual microservice. The first service instance 306 carries out the recursive check using a depth first or breadth first search in the hierarchy or tree structure of the microservice architecture. During this process using breadth first search a parent microservice instance at the root of the tree sends probes to each of its child microservices. When a child microservice receives a probe it checks its own functionality by executing the probe or a process triggered by the probe. If the results are successful then the child microservice sends a probe to each of its own child microservices. If the results are unsuccessful then the child microservice does not send a probe to its child microservices, but rather sends a response to the parent microservice instance to indicate it failed. Optionally the parent microservice gains knowledge about where in the hierarchy or tree the point of failure happened. Using this process it is not necessary to probe every microservice in the microservice architecture where there is at least one point of failure at a level higher than a leaf node of the microservice architecture. As a result there is fine grained information made available to the service instance 106 about currently available functionality in the microservice architecture. The fine grained information is obtained in a fast, effective and efficient manner.

In examples where priorities are used, the internal recursive checks 364 also comprise identifying the importance level of the microservices which are determined to be incapable of processing service requests. For example, if a service instance determines a microservice which only performs trivial tasks associated with a service request is unavailable, the results of the internal recursive checks indicate the service instance will not provide perfect service, but it would be slightly degraded. Whereas, if the microservice determined to be unavailable previously handled vital tasks, the results of the internal recursive checks would indicate the service instance would provide significantly degraded service.

The session border controller 302 sends test service requests to the first service instance 306 as shown in event 366. The test service requests are configured to simulate real requests such as the service request allocated in event 328. In examples where test service requests are sent by the session border controller, the session border controller sends test service requests continuously to the service instance. Therefore, the service instance will continuously be processing service requests, which are either real service requests or test service requests. For example, if the service instance is not allocated any real service requests, then the processing workload of the service instance will be entirely taken up by test service requests. However, if the processing capability of the service instance is entirely occupied by real service requests, then the service instance will not process test service requests. In another example, the test service requests 366 are generated from within the first service instance 306 such that it is not necessary for the session border controller 302 to send test service requests. In this example, the service instance can continue to perform heuristic calculations if the network connection or communications with the session border controller 302 fails. In another example, the test service requests are generated from outside of the application as a whole, to provide multiple views of the internal and holistic solution availability and service performance (e.g. audio quality via each network route) and so inform the heuristics in an improved manner.

Test logic is used to generate test service traffic. Test logic may be located within an SI, at the SBC or elsewhere. Test service results are determined locally by the test logic. Operation 366 in FIG. 3B illustrates test traffic originating from an entity having test logic. Operation 368 in FIG. 3B illustrates test traffic being received and processed by SI 306. Options 370 in FIG. 3B illustrates traffic returning from SI 306 to the test logic as a result of the processed test traffic.

The first service instance 306 performs heuristic calculations 372 based on processing performance data associated with the degree of success the test service request was processed in event 368. The heuristic calculations are performed in the same manner for the test service requests 366 as for real service requests (e.g., event 328).

By ongoing supply of the service instances with test service requests then even if a service instance is not allocated any real service requests, data reflecting the processing performance of the service instance is still collected. Therefore, in the event some service instances become unavailable, there is still data associated with the remaining service instances that provides an indication of the quality with which the remaining service instance process service requests.

Event 334 shows the health service 310 requesting outcome data from the first service instance 306. The request for outcome data 334 in FIG. 3B is the same request for outcome data 334 in FIG. 3A. The outcome data comprises the results from the heuristic calculations performed on the processing of the service request 360, the internal recursive checks 364 and from the heuristic calculations performed on the processing of the test service request 368. In some examples, the request for outcome data by the health service is made in response to the session border controller 302 receiving a service request from a user endpoint 301. Alternatively, the health service 310 requests status indicators periodically at pre-defined time intervals. As shown by the non-filled arrows in FIG. 3B, the outcome data is collected 374 by the first service instance 306 and sent to the health service 310 at event 338. If the health service 310 is connected to more than one service instance (i.e., the health service is located in a region comprising a plurality of service instances) event 336 shows the health service 310 repeating events 334 and 338 for all service instance to which it is connected.

Upon receiving the outcome data, the health service 310 calculates a status indicator unique to the first service instance 106, as shown in event 376.

To perform the status indicator calculations, the health service 310 uses the results from the heuristic calculations 362 based on processing performance data associated with the degree of success the service request was processed in event 328. In some examples, the health service relies on the latest heuristic calculations, such as those performed in event 362. Alternatively, the health service considers the latest heuristic calculations along with previous heuristic calculations performed on previous service requests by the first service instance 306.

The service instance also recalls the results from the recursive checks performed in event 364. In one example, the health service 310 uses the results from the most recent recursive checks. In another example, the health service 310 uses results from multiple recursive checks from a pre-defined time period and the multiple recursive checks are aggregated to provide an average result.

The service instance also uses the results from the heuristic calculations 372 based on processing performance data associated with the degree of success the test service request was processed in event 368. In some examples, the health service 310 relies on the latest heuristic calculations, such as those performed in event 368. This is an efficient approach found to work well in practice. Alternatively, the health service 310 considers the latest heuristic calculations along with previous heuristic calculations performed on previous test service requests. Here more information is taken into account enabling high reliability in a broader range of situations. Note that it is not essential to repeat the health assessments for each SI before dynamically updating the DNS 304; that is the health assessments can be done independently. Thus operations 336 and 376 can occur in any order.

The health service 310 calculates a status indicator at event 376 using the results from the heuristic calculations and the internal recursive checks as inputs into the calculations and uses the status indicator to trigger a dynamic update of the DNS configuration at event 340. The status indicator provides information about the capability of the first service instance 306 to process service requests such that the updated DNS 304 is utilized by the session border controller 302 to allocate future service requests from user end points 301.

In some examples, the status indicator calculations comprise weighting the results from the heuristic calculations associated with the real service requests compared to the heuristic calculations associated with the test service requests. The reason for this is that performance data associated with the processing of real service requests is likely to be more representative of the capability of the service instance to process real service requests compared to the processing of test service requests.

The events 320 to 352 of FIG. 3A and events 360 to 376 of FIG. 3B all contribute to the DNS configuration being continuously updated on the health of the network of service instances with which it is connected to. As a result, upon receiving a service request, the session border controller has access to the necessary information such that it can reliably allocate a service request to provide a service (whether it is excellent or poor service) even if the preferred service instances are not available. The actions performed by the health service 310, session border controller 302, the DNS 304, the first service instance 306 and the second service instance 308 in FIGS. 3A and 3B can all be performed automatically and thus contribute to increasing the reliability of cloud computing implemented telecommunications services.

As an additional measure that is performed in some examples following the update to the DNS 304 configuration, wherein the service instance is automatically sorted into one of a plurality of priority tiers, wherein the priority tiers are recorded in the DNS configuration. Service instances 106 are sorted into priority tiers based on the status indicator recorded for the service instances 106. For example, service instances which provide status indicators associated with excellent processing performance will be placed within the highest priority tier. As a result, the client 102 automatically allocates service requests to available service instances in the highest priority tier of the plurality of priority tiers. The priority tiers are automatically updated as updated status indicators are sent by the health services 114, 116. Therefore, the client 102, via the DNS, has access to a dynamically updating record of which service instances are most suitable for processing service requests, thus providing a reliable system for the allocation of service requests.

Figure 4:
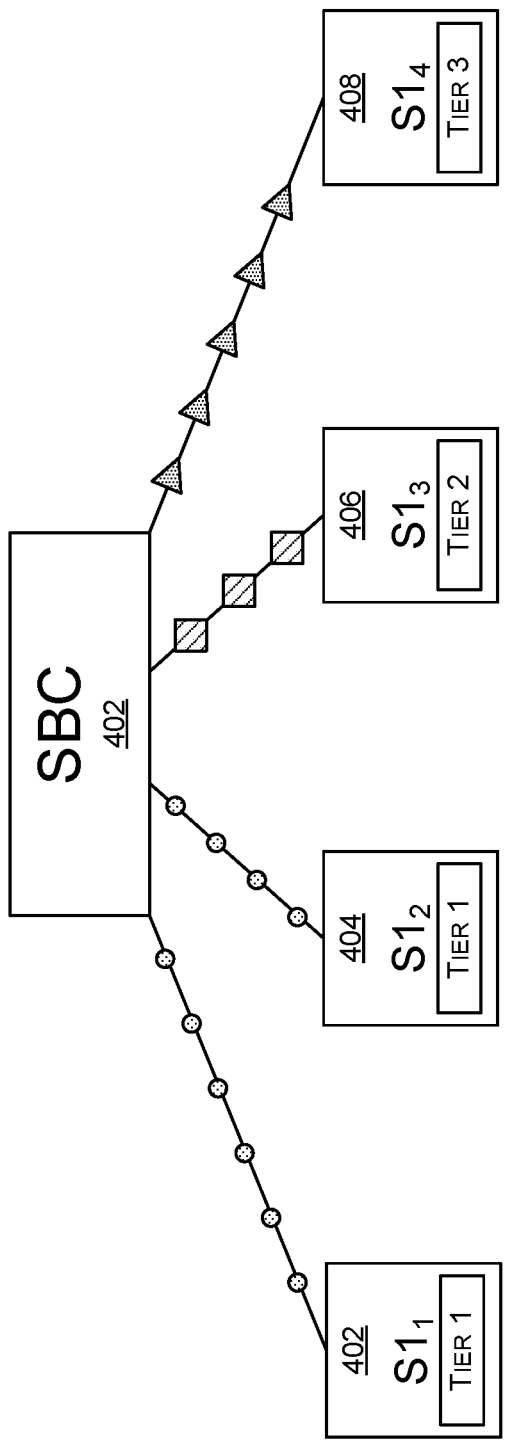
FIG. 4 shows an example of different levels of service quality provided by service instances sorted into priority tiers.

FIG. 4 provides an illustration of different service instances sorted into different priority tiers, providing varying levels of service request processing performance. For example, service instances $SI_1$ and $SI_2$ are sorted into tier 1 and therefore provide excellent service request processing performance (as indicated by the circular symbols connecting $SI_1$ 402 and $SI_2$ 404 to the session border controller 402). $SI_3$ 406 is shown to be sorted into tier 2 and as a result provides poor service request processing performance (as indicated by the square symbols connecting $SI_3$ 406 to the session border controller 102). $SI_4$ 408 is shown to be sorted into tier 3 and therefore provides very poor service request processing performance (as indicated by the triangle symbols connecting $SI_4$ 408 to the session border controller 102).

In another example, following the dynamic update to the DNS configuration, a label is assigned to a service instance based on the value of the status indicator calculated by the health service and whether outcome data was received from a service instance by the health service. For example, if no outcome data was received from a service instance despite an outcome data request being issued to the service instance by the health service, the service instance is labelled as 'dropped'. If the status indicator calculated by a health service indicates poor processing performance, as a result of performing the heuristic calculations and recursive checks, the service instance is labelled as 'degraded'. In contrast, if a status indicator calculated by a health service indicates good processing performance, the service instance is labelled as 'available'. As a final example, if a service instance is currently operating at full processing capacity due to the amount of real service requests they have been allocated, the outcome data additionally comprises an indication the service instance has no processing capacity and the service instance is labelled as 'unavailable'.

Figure 5:
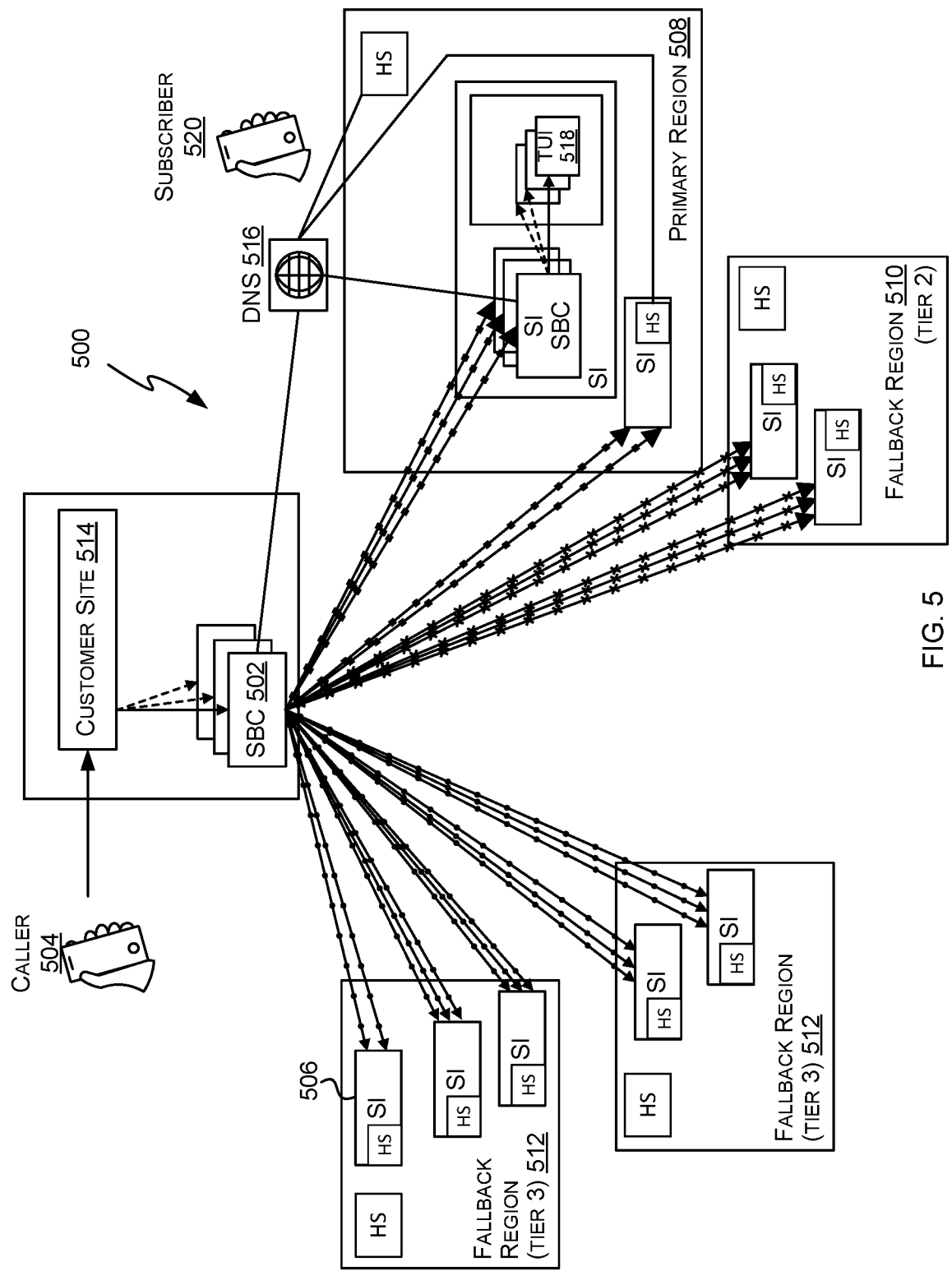
FIG. 5 is a schematic diagram of an example of a communications network comprising a primary region and a plurality of fallback regions.

In some examples, the status indicators and/or labels are used to designate fallback service instances or fallback regions. FIG. 5 shows an example of how fallback regions are implemented into a network of service instances, such as the network illustrated in FIG. 1.

In some examples, to ensure user end points are always provided with service, regardless of whether the service provided is perfect or degraded, service instances or regions are designated as fallback service instances or regions. The fallback service instances or regions are used as contingency options in the event other service instances or regions are unavailable. For example, FIG. 5 shows the use of fallback regions implemented in a network 500 comprising a session border controller (SBC) 502 communicating with service instances (SI) 506 arranged into a primary region 508 and fallback regions, wherein the fallback regions are sorted into tiers 2 510 and 3 512. In this example, the user endpoint is a caller 504 which makes a service request that is received by a customer site 514 before being transferred to the session border controller 502. If service instances within the primary region 508 are able to process service requests, the session border controller 502 allocates the caller's service request to the primary region 508 which provides good service (as indicated by the square symbols on the connection between the service instances of the primary region and the session border controller). However, if the primary region is unavailable, the session border 502 resorts to one of the fallback regions to allocate the service request. FIG. 5 shows the session border controller allocating the service request to the fallback region sorted into tier 2 510 with poor service (as indicated by the cross symbols on the connection between the service instances of the tier 2 fallback region and the session border controller). In another example, if the tier 2 fallback region is also not available, FIG. 5 shows the session border controller allocating the service request to service instances within tier 3 fallback regions 512 with very poor service (as indicated by the circle symbols on the connection between the service instance of the tier 3 fallback region and the session border controller).

The service instances further comprise a domain name system (DNS) 516 which is queried by the session border controller 502 and, for some examples, a telephone user interface (TUI) 518. FIG. 5 also shows a subscriber 520 connected to the communications network wirelessly. The DNS is dynamically updated using the health service as explained herein.

Figure 6:
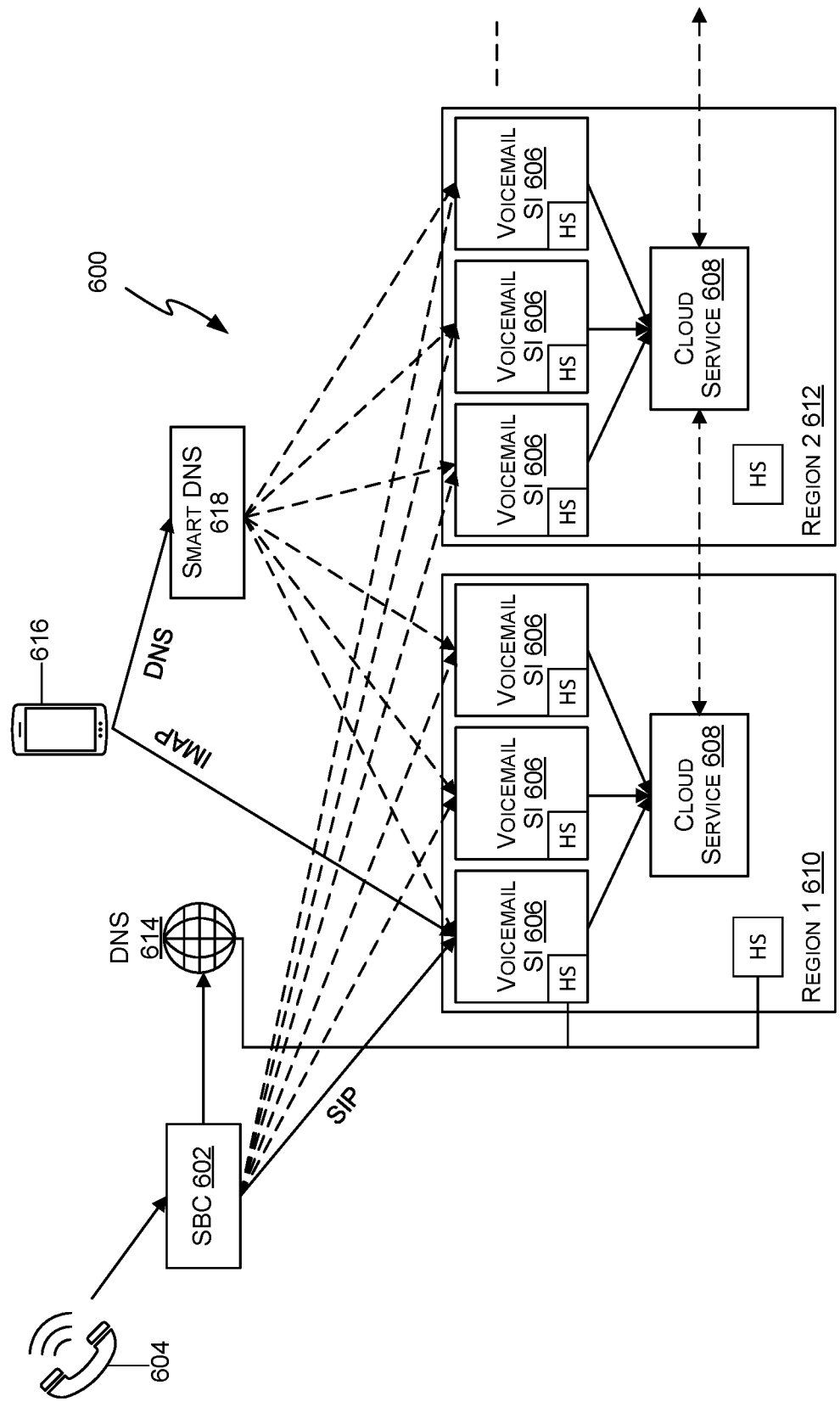
FIG. 6 is a schematic diagram of a communications network facilitating communications between different nodes of a voicemail service.

FIG. 6 shows an example of how a network system 600 comprising a session border controller (SBC) 602 is connected to a plurality of voicemail service instances (SI) 606. The session border controller and voicemail services instances of FIG. 6 are configured to perform the same actions as the client 102, session border controller 302 and service instance 106, 306, 308 of FIGS. 1, 3A and 3B. FIG. 6 shows the voicemail service instances grouped into regions (region 1 610 and region 612), wherein each region is connected via a cloud service 608. The session border controller implements a session initiation protocol (SIP) for processing service requests from a first user endpoint 604. The session border controller 602 also accesses a domain name system (DNS) 614. The second user endpoint 616 may also access the voicemail service instances 606 via an internet message access protocol (IMAP) using the target routing informing supplied via the smart DNS 618 query response. A smart DNS is a service that serves DNS query responses informed by polling of target endpoints for availability status, and typically capable of providing primary/fallback prioritised behaviour such that a) if there are any service targets expected to provide excellent service, they're returned in DNS responses b) otherwise, the response includes targets expected to provide poor service (rather than no targets at all).

Figure 7:
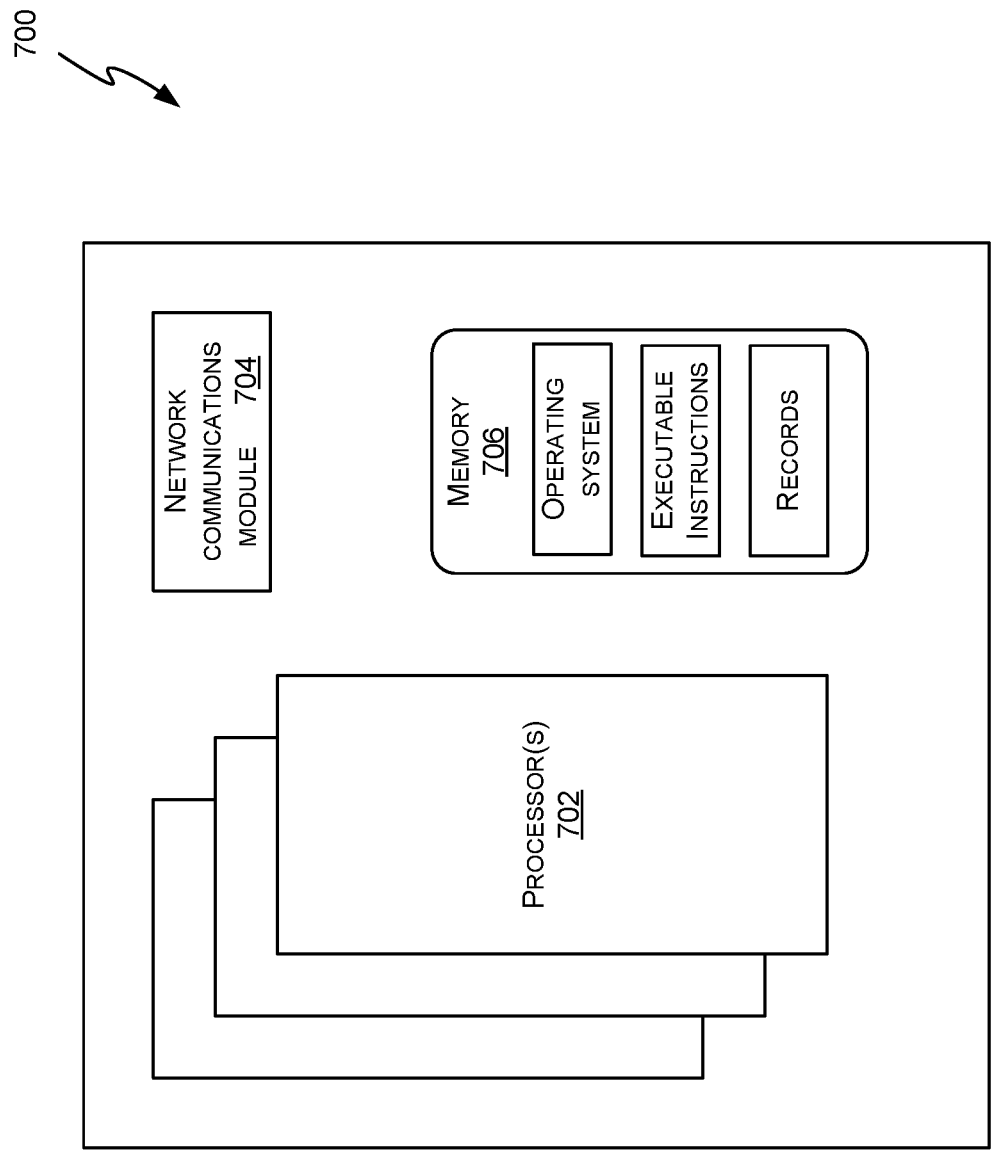
FIG. 7, illustrates an exemplary computing-based device which may be used to implement a session border controller, a client device and/or a service instance.

FIG. 7 shows an example computing system which illustrates various components of an exemplary computing-based device 700 which are implemented as any form of a computing and/or electronic device. The computing device 700 can be implemented as the session border controller 102, the user end point 104 and/or the service instance 106.

Computing-based device 700 comprises one or more processors 702 which are microprocessors, controllers or any other suitable type of processors for processing computer executable instructions to control the operation of the device. In some examples, for example where a system on a chip architecture is used, the processors 700 include one or more fixed function blocks (also referred to as accelerators) which implement a part of the method FIG. 3 in hardware (rather than software or firmware). Platform software comprising an operating system or any other suitable platform software is provided at the computing-based device to enable application software to be executed on the device.

The computer executable instructions are provided using any computer-readable media that is accessible by computing based device 700. Computer-readable media includes, for example, computer storage media such as memory 706 and communications media. Computer storage media, such as memory 706, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 706) is shown within the computing-based device 700 it will be appreciated that the storage is, in some examples, distributed or located remotely and accessed via a network or other communication link (e.g. using a network communications module 704).

Alternatively or in addition to the other examples described herein, examples include any combination of the following:

Clause A A method performed by a health service configured to update a domain name system, DNS, to enable clients, which use the DNS, to allocate service requests to a plurality of service instances which provide the service wherein each service instance comprises a microservice architecture, the method comprising:
  requesting outcome data at least one of the service instances;
  calculating a status indicator for the at least one service instance, wherein the status indicator comprises information about whether a service instance is able to process the service requests; wherein
    the status indicators are calculated using the outcome data, wherein the outcome data is based on results from internal recursive checks performed throughout the microservice architectures of the service instance and heuristic calculations performed on service request performance data; and
  triggering dynamic update to the DNS according to the calculated status indicator.

Clause B The method of clause A, wherein the service request performance data comprises a combination of performance data associated with the processing of real service requests received from user end points and performance data associated with the processing data of test service requests generated without being requested by a user endpoint.

Clause C The method of any preceding clause, comprising calculating the status indicator for each of the service instances and wherein the dynamic update to the DNS comprises sorting each of the service instances into one of at least two priority tiers based on the calculated status indicators for each of the service instances.

Clause D The method of any preceding clause, wherein the internal recursive checks comprise probing the microservices within the microservice architecture of the service instance to determine whether individual ones of the microservices are capable of processing service requests.

Clause E The method of any preceding clause, wherein at least one of the clients is a session border controller.

Clause F The method of clause B, wherein the test service requests are repeatedly generated.

Clause G The method of clause B, wherein the test service requests are generated by the client and/or individual ones of the service instances.

Clause H The method of clause F, wherein the services instances process test service requests unless a processing capability of the service instance is occupied by real service requests.

Clause I The method of clause B, wherein the status indicator calculations comprise weighting the service request performance data from the processing of real service requests over the service request performance processing data from test service requests.

Clause J The method of clause B, wherein the heuristic calculations comprise determining a percentage of service requests processed with service quality relative to one or more thresholds.

Clause K The method of clause C, wherein the sorting of the service instances is dynamically updated in the DNS based on updated status indicators.

Clause L The method of clause C, wherein received service requests are automatically allocated to a service instance in a highest priority tier of the priority tiers and the received service requests are automatically allocated to a service instance outside the highest priority tier in the event the highest priority tier is unavailable.

Clause M The method of any preceding clause, wherein the microservices are assigned different importance levels, where microservices with a highest importance level process vital tasks associated with service requests, whereas microservices with lower importance levels process less vital tasks associated with service requests.

Clause N The method of clause M, wherein the internal recursive checks also comprise identifying the importance level of the microservices which are determined to be incapable of processing service requests.

Clause O The method of any preceding clause, comprising calculating the status indicator for each of the service instances and wherein the service instances are labelled as unavailable, dropped, degraded or available based on the calculated status indicators for individual ones of the service instances.

Clause P The method of any preceding clause, comprising in the event one or more service instances are unable to process service requests, reliably allocating service requests to a fallback service instance based on the status indicator of the fallback service instance.

Clause Q The method of any preceding clause, wherein the service instances are grouped into regions and the regions are sorted into priority tiers based on the calculated status indicators for the individual ones of the service instances within each region.

Clause R The method of clause L, wherein the health service is located within a service instance such that the health service receives outcome data from the service instance it is located within; or
  within a region such that the health service receives outcome data from the service instances with the same region as the health service.

Clause S A computer readable medium storing instructions which when executed perform a method performed by a health service configured to update a domain name system, DNS, to enable clients, which use the DNS, to allocate service requests to a plurality of service instances which provide the service wherein each service instance comprises a microservice architecture, the method comprising:
- requesting outcome data from at least one of the service instances;
- calculating a status indicator for the at least one service instance, wherein the status indicator comprises information about whether the service instance is able to process the service requests; wherein
  - the status indicator is calculated using the outcome data, wherein the outcome data is based on results from internal recursive checks performed throughout the microservice architecture of the service instance and heuristic calculations performed on service request performance data;
- triggering dynamic update to the DNS according to the calculated status indicator.

Clause T A system configured to update a domain name system, DNS, to enable clients which use the DNS, to allocate service requests to service instances wherein each service instance comprises a microservice architecture, comprising:
- a plurality of service instances, each comprising a microservice architecture, each service instance configured to:
  - perform internal recursive checks throughout a respective microservice architecture;
  - perform heuristic calculations on historical service request processing performance data;
- a plurality of health services each configured to:
  - request outcome data from one of the service instances, wherein the outcome data is based on the results of the internal recursive checks and the results of the heuristic calculations;
  - calculate a status indicator using the outcome data;
  - trigger an update to the DNS according to the calculated status indicator.

Clause U, A method of managing a service instance implemented by a plurality of microservices executing in a computing network, the method comprising:
- receiving outcome data for the service instance, wherein the outcome data is based on internal recursive checks performed on the plurality of microservices and heuristic calculations performed on performance data indicative of quality of service associated with historical processing of requests for the instance;
- based on the outcome data, calculating a status indicator for the service instance, wherein the status indicator is indicative of whether the service instance is able to process additional requests for the service instance;
- updating a domain name system (DNS) according to the calculated status indicator, wherein the DNS is configured to:
  - receive the additional requests for the service instance; and based on the status indicator, allocate the additional requests to selected ones of the plurality of microservices.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method performed by a health service executing on a computing device, the health service configured to update a domain name system (DNS) to enable network elements of a communications network to use the DNS to allocate service requests to a plurality of service instances configured to provide the service, wherein each service instance comprises a microservice architecture, the method comprising:
   requesting outcome data from at least one of the service instances;
   calculating a status indicator for the at least one service instance, wherein the status indicator comprises information about whether the service instance is able to process the service requests;
   wherein the status indicator is calculated using the outcome data, wherein the outcome data is based on results from internal recursive checks performed throughout the microservice architecture of the service instance and heuristic calculations performed on service request performance data comprising measurements and empirical observations obtained automatically from the network elements of the communications network, the measurements and empirical observations associated with a quality of service for processing service requests by the at least one service instance,
   wherein the heuristic calculations comprise rules, criteria, or thresholds indicative of service reliability or quality, and
   wherein the service request performance data is continuously generated using test service traffic to enable the heuristic calculations to be performed when there is no live data traffic; and
   triggering a dynamic update to the DNS according to the calculated status indicator.

2. The method of claim 1, wherein the service request performance data comprises a combination of performance data associated with processing of real service requests received from user end points and performance data associated with processing data of test service requests generated without being requested by a user endpoint.

3. The method of claim 2, wherein the test service requests are repeatedly generated.

4. The method of claim 2, wherein the test service requests are generated by a client device or individual ones of the service instances.

5. The method of claim 3, wherein the service instances process test service requests unless processing capability of the service instance is occupied by real service requests.

6. The method of claim 2, wherein the status indicator calculations comprise weighting the service request performance data from processing of real service requests over the service request performance processing data from test service requests.

7. The method of claim 2, wherein the heuristic calculations comprise determining a percentage of service requests processed with service quality relative to one or more thresholds.

8. The method of claim 1, comprising calculating the status indicator for each of the service instances and wherein the dynamic update to the DNS comprises sorting each of the service instances into one of at least two priority tiers based on the calculated status indicators for each of the service instances.

9. The method of claim 8, wherein the sorting of the service instances is dynamically updated in the DNS based on updated status indicators.

10. The method of claim 8, wherein received service requests are automatically allocated to a service instance in a highest priority tier of the priority tiers and the received service requests are automatically allocated to a service instance outside the highest priority tier when the highest priority tier is unavailable.

11. The method of claim 1, wherein the internal recursive checks comprise probing the microservices within the microservice architecture of the service instance to determine whether individual ones of the microservices are capable of processing service requests.

12. The method of claim 1, wherein at least one of the network elements is a session border controller.

13. The method of claim 1, wherein the microservices are assigned different importance levels, where microservices with a highest importance level process vital tasks associated with service requests, whereas microservices with lower importance levels process less vital tasks associated with service requests.

14. The method of claim 13, wherein the internal recursive checks also comprise identifying the importance level of the microservices which are determined to be incapable of processing service requests.

15. The method of claim 1, further comprising calculating the status indicator for each of the service instances and wherein the service instances are labelled as unavailable, dropped, degraded or available based on the calculated status indicators for individual ones of the service instances.

16. The method of claim 1, further comprising:
   when one or more service instances are unable to process service requests, reliably allocating service requests to a fallback service instance based on the status indicator of the fallback service instance.

17. The method of claim 1, wherein the service instances are grouped into regions and the regions are sorted into priority tiers based on the calculated status indicators for individual ones of the service instances within each region.

18. The method of claim 17, wherein the health service is located within a service instance such that the health service receives outcome data from the service instance it is located within; or
   within a region such that the health service receives outcome data from the service instances within the same region as the health service.

19. A non-transitory computer-readable medium storing instructions which, when executed by a processor of a computing system, cause the computing system to perform operations comprising:
   receiving outcome data for a service instance implemented by a plurality of microservices executing in a computing network, wherein the outcome data is based on internal recursive checks performed on the plurality of microservices and heuristic calculations performed on performance data indicative of quality of service associated with historical processing of requests for the instance, the performance data comprising measurements and empirical observations obtained automatically from network elements of the computing network,
   wherein the heuristic calculations comprise rules, criteria, or thresholds indicative of service reliability or quality, and wherein the performance data is continuously generated using test service traffic to enable the heuristic calculations to be performed when there is no live data traffic;
   based on the outcome data, calculating a status indicator for the service instance, wherein the status indicator is indicative of whether the service instance is able to process additional requests for the service instance;

updating a domain name system (DNS) according to the calculated status indicator, wherein the DNS is configured to:

receive the additional requests for the service instance; and based on the status indicator, allocate the additional requests to selected ones of the plurality of microservices.

20. A system configured to update a domain name system (DNS) to allocate service requests to service instances, wherein each service instance comprises a microservice architecture, the system comprising a processor and memory storing instructions that, when executed by the processor, cause the system to:

execute a plurality of service instances comprising a microservice architecture, the service instances configured to:

perform internal recursive checks throughout a respective microservice architecture;

perform heuristic calculations on historical service request processing performance data, the performance data comprising measurements and empirical observations obtained automatically from network elements of a computing network, wherein the heuristic calculations comprise rules, criteria, or thresholds indicative of service reliability or quality, and wherein the performance data is continuously generated using test service traffic to enable the heuristic calculations to be performed when there is no live data traffic;

execute a plurality of health services configured to:

request outcome data from one of the service instances, wherein the outcome data is based on results of the internal recursive checks and results of the heuristic calculations;

calculate a status indicator using the outcome data; and trigger an update to the DNS according to the calculated status indicator.

* * * * *